US011012160B2

(12) United States Patent
Kowalevicz et al.

(10) Patent No.: US 11,012,160 B2
(45) Date of Patent: May 18, 2021

(54) PHASE CHANGE DETECTION IN OPTICAL SIGNALS

(71) Applicant: RAYTHEON COMPANY, Waltham, MA (US)

(72) Inventors: Andrew Kowalevicz, Arlington, VA (US); Gary M. Graceffo, Burke, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/377,927

(22) Filed: Apr. 8, 2019

(65) Prior Publication Data

US 2019/0319714 A1    Oct. 17, 2019

Related U.S. Application Data

(60) Provisional application No. 62/656,821, filed on Apr. 12, 2018.

(51) Int. Cl.
*H04B 10/61* (2013.01)

(52) U.S. Cl.
CPC ......... *H04B 10/612* (2013.01); *H04B 10/615* (2013.01)

(58) Field of Classification Search
CPC .. H04B 10/615; H04B 10/677; H04B 10/612; H04B 10/5561; H04B 10/11
See application file for complete search history.

(56) References Cited

U.S. PATENT DOCUMENTS

| | | | | |
|---|---|---|---|---|
| 3,936,603 A | * | 2/1976 | Guppy | ...................... H04L 1/20 375/376 |
| 4,495,477 A | | 1/1985 | Weber | |
| 4,750,192 A | | 6/1988 | Dzung | |
| 5,371,623 A | * | 12/1994 | Eastmond | .......... H04B 10/1149 398/27 |

(Continued)

FOREIGN PATENT DOCUMENTS

| | | |
|---|---|---|
| JP | H0591047 A | 4/1993 |
| JP | 2015532030 A | 11/2015 |

(Continued)

OTHER PUBLICATIONS

Arimoto et al., "High-speed free-space laser communication", Performance and Management of Complex Communications Networks, 1998, pp. 175-190.

(Continued)

*Primary Examiner* — Mina M Shalaby

(74) *Attorney, Agent, or Firm* — Lando & Anastasi, LLP

(57) ABSTRACT

Optical signal receivers and methods are provided that include multiple optical resonators, each of which receives a portion of an arriving optical signal. Various of the optical resonators are tuned or detuned from a carrier wavelength, and produce an intensity modulated output signal in response to modulation transitions in the arriving optical signal. A detector determines phase transitions in the arriving optical signal, by analyzing the intensity modulation output signals from the optical resonators, and distinguishes between differing phase transitions that result in a common final state of the arriving optical signal.

19 Claims, 9 Drawing Sheets

(56) References Cited

U.S. PATENT DOCUMENTS

| | | | |
|---|---|---|---|
| 5,550,373 A | 8/1996 | Cole et al. | |
| 5,581,575 A * | 12/1996 | Zehavi | H03M 13/2707 |
| | | | 370/335 |
| 5,608,560 A | 3/1997 | Abram et al. | |
| 5,684,793 A * | 11/1997 | Kiema | H04B 1/709 |
| | | | 370/335 |
| 5,796,757 A | 8/1998 | Czaja | |
| 5,841,798 A * | 11/1998 | Chen | G01S 7/484 |
| | | | 372/11 |
| 5,952,936 A | 9/1999 | Enomoto | |
| 6,240,109 B1 | 5/2001 | Shieh | |
| 6,243,200 B1 | 6/2001 | Zhou et al. | |
| 6,456,422 B1 | 9/2002 | Hayes et al. | |
| 6,493,873 B1 | 12/2002 | Williams | |
| 7,092,641 B2 * | 8/2006 | Windover | H04B 10/504 |
| | | | 372/8 |
| 7,245,833 B1 * | 7/2007 | Volkening | H04B 10/2575 |
| | | | 398/116 |
| 7,259,901 B2 | 8/2007 | Parsons et al. | |
| 7,411,726 B2 | 8/2008 | Caplan | |
| 7,474,859 B2 | 1/2009 | Mahgerefteh et al. | |
| 7,526,210 B2 | 4/2009 | Liu | |
| 7,529,490 B2 | 5/2009 | Hoshida | |
| 7,646,834 B2 | 1/2010 | Friedman | |
| 7,738,798 B2 | 6/2010 | Mayer et al. | |
| 7,937,000 B2 * | 5/2011 | Yokoyama | H04B 10/675 |
| | | | 398/212 |
| 7,991,297 B2 | 8/2011 | Mahgerefteh et al. | |
| 8,055,137 B2 | 11/2011 | Wang et al. | |
| 8,111,402 B2 | 2/2012 | Le et al. | |
| 8,125,644 B2 * | 2/2012 | Crowe | G01R 33/032 |
| | | | 324/244.1 |
| 8,295,712 B2 * | 10/2012 | Chen | H04B 10/516 |
| | | | 385/14 |
| 8,394,329 B2 * | 3/2013 | Jaworski | G01N 21/7746 |
| | | | 250/227.14 |
| 8,411,351 B2 | 4/2013 | McCallion et al. | |
| 8,554,085 B1 | 10/2013 | Yap et al. | |
| 8,693,875 B2 | 4/2014 | Banwell et al. | |
| 8,908,187 B2 | 12/2014 | Strandjord et al. | |
| 9,018,575 B2 | 4/2015 | Kowalevicz et al. | |
| 9,097,526 B1 | 8/2015 | Sanders et al. | |
| 9,110,154 B1 | 8/2015 | Bates et al. | |
| 9,115,994 B2 | 8/2015 | Strandjord et al. | |
| 9,165,963 B2 | 10/2015 | Kowalevicz et al. | |
| 9,171,219 B2 | 10/2015 | Kowalevicz | |
| 9,240,843 B1 | 1/2016 | Malouin et al. | |
| 9,400,414 B2 | 7/2016 | Kowalevicz | |
| 9,503,660 B2 | 11/2016 | Kowalevicz et al. | |
| 9,509,411 B2 | 11/2016 | D'Errico | |
| 9,535,245 B1 | 1/2017 | Kowalevicz | |
| 9,684,127 B2 | 6/2017 | Qi et al. | |
| 9,755,674 B2 * | 9/2017 | Graceffo | H04B 1/0475 |
| 9,823,075 B2 | 11/2017 | Yao | |
| 9,876,580 B2 | 1/2018 | Yuan et al. | |
| 9,887,779 B2 | 2/2018 | Kowalevicz | |
| 9,900,031 B2 | 2/2018 | Kowalevicz et al. | |
| 9,905,999 B2 | 2/2018 | Li et al. | |
| 9,973,281 B2 | 5/2018 | Kowalevicz et al. | |
| 9,989,989 B2 | 6/2018 | Kowalevicz | |
| 10,050,704 B1 * | 8/2018 | Yap | H01S 5/0687 |
| 10,164,765 B2 | 12/2018 | Dolgin et al. | |
| 10,177,856 B2 | 1/2019 | Kowalevicz et al. | |
| 10,181,898 B2 * | 1/2019 | Tezak | G11C 7/005 |
| 10,181,903 B2 * | 1/2019 | Taylor | H04B 10/2504 |
| 10,205,526 B2 | 2/2019 | Kowalevicz | |
| 10,225,020 B2 | 3/2019 | Dolgin et al. | |
| 10,243,670 B2 | 3/2019 | Kowalevicz et al. | |
| 10,243,673 B2 | 3/2019 | Dolgin et al. | |
| 10,250,292 B2 | 4/2019 | Graceffo et al. | |
| 10,256,917 B2 | 4/2019 | Dolgin et al. | |
| 10,305,602 B2 | 5/2019 | Dolgin et al. | |
| 10,313,022 B2 | 6/2019 | Dolgin et al. | |
| 10,374,743 B2 * | 8/2019 | Dolgin | H04B 14/0221 |
| | | | 14/221 |
| 10,415,971 B2 | 9/2019 | Krueger et al. | |
| 10,524,029 B2 * | 12/2019 | Vincent | H04Q 11/0005 |
| 2002/0071184 A1 | 6/2002 | Nishi et al. | |
| 2002/0196497 A1 | 12/2002 | LoCascio et al. | |
| 2003/0012235 A1 * | 1/2003 | Yokoyama | H01S 5/10 |
| | | | 372/25 |
| 2003/0227949 A1 | 12/2003 | Meyers | |
| 2004/0062945 A1 | 4/2004 | Domash et al. | |
| 2004/0096151 A1 * | 5/2004 | Svilans | G01J 3/12 |
| | | | 385/27 |
| 2004/0142696 A1 | 7/2004 | Saunders et al. | |
| 2005/0026578 A1 | 2/2005 | Kelley | |
| 2005/0225775 A1 | 10/2005 | Brunfeld et al. | |
| 2005/0265728 A1 | 12/2005 | Yao | |
| 2006/0013591 A1 * | 1/2006 | Rohde | H04B 10/675 |
| | | | 398/152 |
| 2006/0023987 A1 | 2/2006 | Yao | |
| 2006/0104321 A1 | 5/2006 | He | |
| 2006/0200553 A1 | 9/2006 | Xu | |
| 2007/0031150 A1 * | 2/2007 | Fisher | H04B 10/1125 |
| | | | 398/128 |
| 2007/0216988 A1 * | 9/2007 | Caplan | H04B 10/677 |
| | | | 359/325 |
| 2007/0291115 A1 | 12/2007 | Bachelder et al. | |
| 2008/0034866 A1 | 2/2008 | Kilic et al. | |
| 2008/0054160 A1 | 3/2008 | Yao | |
| 2008/0074736 A1 | 3/2008 | Kuo et al. | |
| 2008/0079947 A1 | 4/2008 | Sanders et al. | |
| 2008/0187268 A1 | 8/2008 | Kaneko et al. | |
| 2008/0226300 A1 * | 9/2008 | Mayer | H04B 10/677 |
| | | | 398/158 |
| 2008/0240736 A1 * | 10/2008 | Ji | H04B 10/677 |
| | | | 398/202 |
| 2008/0266573 A1 * | 10/2008 | Choi | G01N 21/7746 |
| | | | 356/481 |
| 2008/0310789 A1 | 12/2008 | Mihailov et al. | |
| 2010/0073681 A1 | 3/2010 | Qiu et al. | |
| 2011/0097085 A1 * | 4/2011 | Oda | H04B 10/2569 |
| | | | 398/65 |
| 2011/0170881 A1 | 7/2011 | Nakashima et al. | |
| 2011/0274436 A1 | 11/2011 | McNicol et al. | |
| 2012/0121271 A1 * | 5/2012 | Wood | H04B 10/1121 |
| | | | 398/118 |
| 2012/0269523 A1 * | 10/2012 | McCallion | H04B 10/677 |
| | | | 398/202 |
| 2012/0307253 A1 | 12/2012 | Sanders et al. | |
| 2013/0003766 A1 * | 1/2013 | Savchenkov | G02F 2/02 |
| | | | 372/38.01 |
| 2013/0148982 A1 | 6/2013 | Barton et al. | |
| 2013/0195450 A1 * | 8/2013 | Ashwood-Smith | |
| | | | H04Q 11/0005 |
| | | | 398/49 |
| 2013/0272337 A1 * | 10/2013 | Tan | H01S 5/02284 |
| | | | 372/107 |
| 2013/0327145 A1 | 12/2013 | Walker et al. | |
| 2014/0308039 A1 | 10/2014 | Sun et al. | |
| 2014/0314406 A1 * | 10/2014 | Zerbe | H04J 14/02 |
| | | | 398/38 |
| 2014/0369699 A1 | 12/2014 | Strandjord et al. | |
| 2015/0160257 A1 | 6/2015 | Bulatowicz | |
| 2015/0171957 A1 | 6/2015 | Featherston et al. | |
| 2015/0236784 A1 | 8/2015 | Vahala et al. | |
| 2015/0241278 A1 | 8/2015 | Holczer | |
| 2015/0260914 A1 * | 9/2015 | Zheng | G02B 6/126 |
| | | | 385/11 |
| 2015/0277053 A1 * | 10/2015 | Zheng | G02F 1/3132 |
| | | | 385/31 |
| 2015/0304053 A1 | 10/2015 | Pfnuer et al. | |
| 2015/0316382 A1 | 11/2015 | Sanders et al. | |
| 2015/0318982 A1 | 11/2015 | Kowalevicz et al. | |
| 2015/0319061 A1 * | 11/2015 | Kowalevicz | H04L 9/16 |
| | | | 709/224 |
| 2015/0372395 A1 | 12/2015 | Lavedas | |
| 2016/0006211 A1 | 1/2016 | Kim | |

(56) References Cited

U.S. PATENT DOCUMENTS

| | | |
|---|---|---|
| 2016/0013870 A1* | 1/2016 | Sorin ................ G02B 6/4208 398/208 |
| 2016/0047655 A1 | 2/2016 | Qiu et al. |
| 2016/0047677 A1* | 2/2016 | Heidrich ............ G01N 21/7746 356/480 |
| 2016/0072586 A1* | 3/2016 | Hochberg ............. H04B 10/40 398/136 |
| 2016/0112776 A1 | 4/2016 | Kim |
| 2016/0116288 A1 | 4/2016 | Song et al. |
| 2016/0118769 A1 | 4/2016 | Narumi |
| 2016/0282181 A1 | 9/2016 | Shibayama et al. |
| 2016/0352515 A1 | 12/2016 | Bunandar et al. |
| 2017/0085970 A1 | 3/2017 | Zhang |
| 2017/0346564 A1 | 11/2017 | Wiswell |
| 2018/0011232 A1 | 1/2018 | Kawai et al. |
| 2018/0034550 A1 | 2/2018 | Rakich et al. |
| 2018/0054259 A1* | 2/2018 | Kowalevicz ........... H04B 10/67 |
| 2018/0065259 A1 | 3/2018 | Gibbs |
| 2018/0091227 A1* | 3/2018 | Dolgin ................... H04B 10/11 |
| 2018/0091228 A1* | 3/2018 | Kowalevicz ....... H04B 10/1123 |
| 2018/0091230 A1* | 3/2018 | Dolgin ................ H04B 10/114 |
| 2018/0091232 A1* | 3/2018 | Dolgin ................ H04B 10/672 |
| 2018/0102853 A1* | 4/2018 | Dolgin ................ H04B 10/612 |
| 2018/0113024 A1 | 4/2018 | Hirose et al. |
| 2018/0145764 A1* | 5/2018 | Dolgin ................ H04B 10/676 |
| 2018/0145765 A1* | 5/2018 | Kowalevicz ......... H04B 10/676 |
| 2018/0167145 A1* | 6/2018 | Dolgin ................. H04B 10/67 |
| 2018/0205463 A1* | 7/2018 | Karpov ............ H04B 10/25077 |
| 2018/0224332 A1 | 8/2018 | Ooi et al. |
| 2018/0234231 A1* | 8/2018 | Dolgin ............... H04B 10/5161 |
| 2018/0270010 A1 | 9/2018 | Troeltzsch et al. |
| 2018/0313642 A1* | 11/2018 | Dolgin ................... G01B 11/06 |
| 2018/0367223 A1* | 12/2018 | Graceffo ................. H04B 10/11 |
| 2018/0372517 A1 | 12/2018 | Yao et al. |
| 2019/0007091 A1* | 1/2019 | Graceffo ................. H04B 10/54 |
| 2019/0017824 A1 | 1/2019 | Qiu et al. |
| 2019/0158208 A1 | 5/2019 | Dolgin et al. |
| 2019/0219396 A1 | 7/2019 | Krueger et al. |
| 2019/0280780 A1* | 9/2019 | Graceffo ................... G02F 2/00 |
| 2019/0319714 A1* | 10/2019 | Kowalevicz ......... H04B 10/615 |

FOREIGN PATENT DOCUMENTS

| | | |
|---|---|---|
| WO | 0195534 A2 | 12/2001 |
| WO | 2016170466 A1 | 10/2016 |

OTHER PUBLICATIONS

Wright et al., "Adaptive optics correction into single mode fiber for a low Earth orbiting space to ground optical communication link using the OPALs downlink", Optics Express, vol. 23, Dec. 2015, pp. 1-8.

Andrews et al., "Final Report: Channel Characterization for Free-Space Optical Communications, Phase 0 testing at Hollister, CA, Phase 2 Final Testing at China Lake, CA", Jul. 2012, pp. 1-60. Retrieved from <URL: <http://www.dtic.mil/cgi-bin/GetTRDoc?Location=U2&doc=GetTRDoc.pdf&AD=ADA565323>> and accessed on Nov. 17, 2017.

Juarez et al., "High-sensitivity DPSK receiver for high-bandwidth free-space optical communication links", Optics Express, vol. 19, May 2011, pp. 1-8.

Zhang, L. et al. "Microring-based Modulation and Demodulation of DPSK Signal" Optical Society of America, Optic Express, vol. 15, No. 18, Sep. 3, 2007.

Fang et al., "Multi-channel Silicon Photonic Receiver Based On Ring-resonators", Optics Express, vol. 18, No. 13, pp. 13510-13515, Jun. 21, 2010.

Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

Office Action in European Patent Application No. 17787705.7 dated Mar. 23, 2020.

Office Action in Japanese Patent Application No. 2019-616435 dated Mar. 30, 2021.

* cited by examiner

PHASE CHANGE DETECTION IN OPTICAL SIGNALS

CROSS-REFERENCE TO RELATED APPLICATIONS

This application claims the benefits under 35 U.S.C. § 119(e) and PCT Article 8 of U.S. Provisional Application No. 62/656,821 filed on Apr. 12, 2018, which is herein incorporated by reference in its entirety for all purposes.

BACKGROUND

Light waves may be made to carry information by modulating a light source, often a laser source, to change various properties of the light, such as its amplitude, phase, frequency, wavelength, etc. The light waves may be in the visible spectral band, the infrared spectral band, or another region of the electromagnetic spectrum. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, such as the amplitude, phase transitions, and the like, from which the underlying signal and the information may be recovered.

Various forms of optical modulation include phase variations of coherent light. Encoded information may include transmitted communication data or other information such as information about the source of the optical signal, interaction of the optical signal with an object, the optical channel through which the optical signal traveled, and/or objects with which it interacted. Conventional receivers capable of demodulating phase variations can be highly complex, requiring precision optics, local oscillators, gratings (such as Fiber Bragg Gratings), and/or delay line interferometers (DLI), etc. Receivers for high-order coherently encoded signals conventionally require frequency controlled lasers to serve as local oscillators (LO), multiple detectors, and significant digital signal processing (DSP).

SUMMARY OF INVENTION

Aspects and examples described herein provide systems and methods for demodulation of phase variations in optical signals. In particular, certain examples include a receiver having an optical resonator, such as a Fabry-Perot filter/resonator, micro-ring, or other resonator, for converting phase-encoded optical signals into one or more intensity-encoded optical signals. The intensity-encoded optical signals may be easily converted to electrical signals, and processed to determine the phase variations in the originally received optical signal. Systems and methods herein using optical resonators may also function over a broad range of modulation rates without modification.

In various examples, two or more optical resonators may be employed to interact with an arriving light signal, and through processing and comparison of the response (e.g., the emitted intensity-encoded light) from the two or more optical resonators, various information may be determined regarding phase variations in the arriving light signal, including determining and distinguishing broad phase variations (e.g., 360° or more) and distinguishing the direction of phase variations, e.g., a phase advance from a phase retreat, by interaction of the optical signal with an optical resonator as the phase variation occurs/arrives.

According to one aspect, an optical signal receiver is provided that includes a first optical resonator configured to receive an arriving optical signal, and to emit first output optical signal energy in response to receiving the arriving optical signal, a second optical resonator configured to receive the arriving optical signal, and to emit second output optical signal energy in response to receiving the arriving optical signal, and a detector configured to determine a phase transition in the arriving optical signal based upon a transient response of at least one of the first output optical signal energy and the second output optical signal energy.

In some embodiments, the detector distinguishes between phase transitions that result in a common final state of the arriving optical signal.

In some embodiments, the detector determines phase transitions of 360° or greater.

In certain examples, each of the first and second optical resonators is an etalon having two semi-reflective surfaces configured to at least partially trap optical signal energy by reflecting a portion of the optical signal energy impinging upon each of the semi-reflective surfaces.

Certain embodiments include a third optical resonator and the detector is configured to determine the phase transition based at least in part upon a comparison between at least two of the first output optical signal energy, the second output optical signal energy, and a third output optical signal energy from the third optical resonator.

According to another embodiment, a method of detecting information encoded in an optical signal includes receiving a portion of the optical signal at each of a plurality of optical resonators, analyzing a respective output optical signal from each of the plurality of optical resonators, and determining a phase transition in the optical signal based on one or more variations in intensity level of one or more of the output optical signals.

In one example, determining the phase transition includes uniquely identifying a magnitude and a direction of the phase transition from among a set of candidate phase transitions, the set of candidate phase transitions being a set of phase transitions that result in a common final state of the arriving optical signal. Determining the phase transition may include distinguishing phase transitions of 360° or greater.

In certain examples, each of the plurality of optical resonators is an etalon having two semi-reflective surfaces and the method includes producing the respective output optical signal from each of the plurality of optical resonators by resonating optical signal energy inside each of the plurality of optical resonators by reflecting a portion of the optical signal energy impinging upon each of the semi-reflective surfaces.

According to another embodiment, a method of transmitting information comprises providing an optical signal with an initial state having an initial phase and an initial amplitude, modulating the optical signal from the initial state to a final state through a first phase transition having a first amount of change in phase and a first direction of change in phase to represent a first information symbol, and modulating the optical signal from the initial state to the final state through a second phase transition having a second amount of change in phase and a second direction of change in phase to represent a second information symbol, the second information symbol being different from the first information signal.

Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1B:
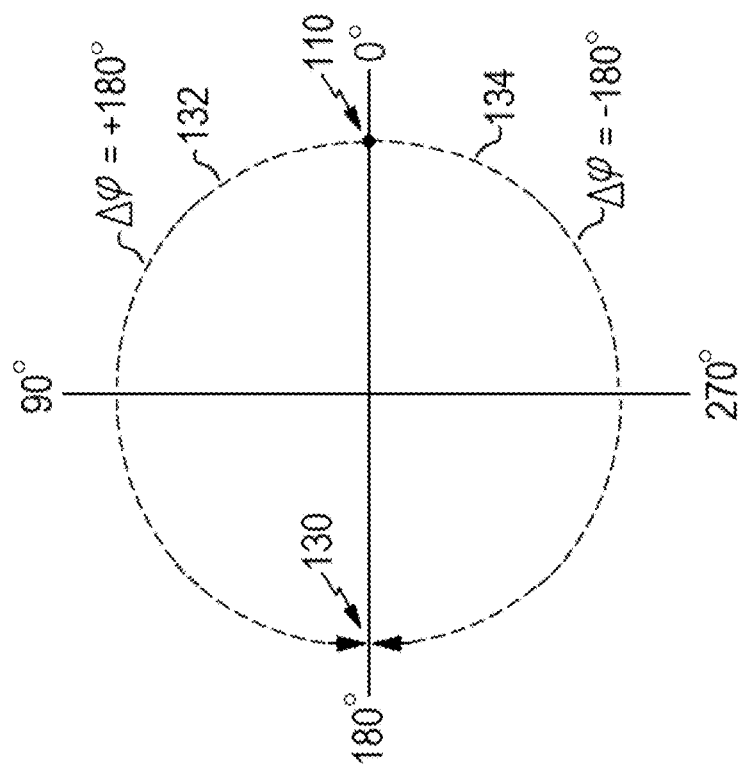
FIGS. 1A-1F are polar diagrams illustrating various optical signal phase transitions.
Figure 1A:
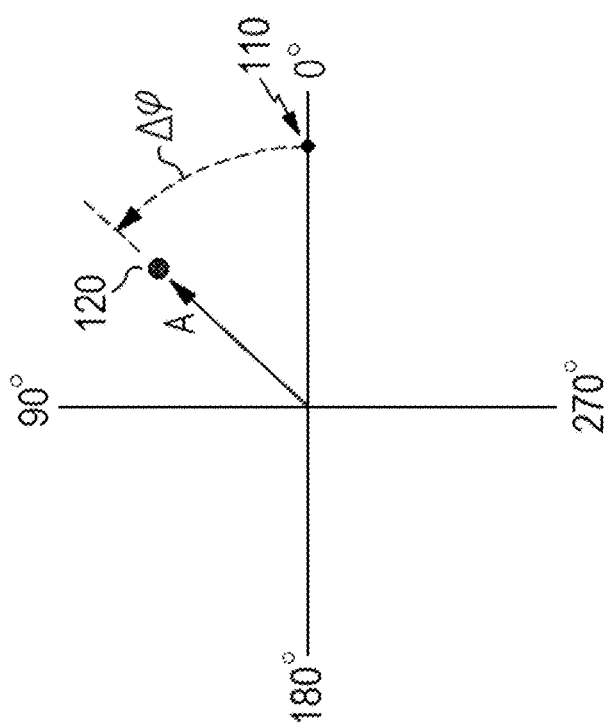

Aspects and examples described herein provide systems and methods for demodulation of phase variations in optical signals. In particular, certain examples include a receiver having an optical resonator, such as a Fabry-Perot filter/resonator, micro-ring, or other resonator, for converting phase-encoded optical signals into one or more intensity-encoded optical signals. The intensity-encoded optical signals may be easily converted to electrical signals, and processed to determine the phase variations in the originally received optical signal. Systems and methods herein using optical resonators may also function over a broad range of modulation rates without modification.

Systems and methods described herein are capable of not only detecting conventional phase variations, but also capable of distinguishing positive phase transitions (e.g., phase advances) from negative phase transitions (e.g., phase retreats) even when such transitions yield the same resulting phase relative to the initial phase. Conventional phase demodulating receivers instantiate a comparison of a resulting phase to the initial (pre-transition) phase, and are thus incapable of distinguishing, for example, a +360° transition from a −360° transition, each of which results in the same final signal phase (e.g., relative to a reference, such as the initial phase prior to the transition).

Accordingly, systems and methods herein are capable of distinguishing a +180° phase transition from a −180° phase transition, and of distinguishing a +360° transition from a −360° transition, etc. Further, systems and methods herein may be used to distinguish a +720° phase transition from a +360° phase transition. In general, systems and methods described herein may be advantageously applied to distinguish between any number of phase transitions that yield an identical resulting phase of a signal, such as but not limited to: +90°/−270°, −90°/+270°, +180°/−180°, +360°/−360°, +540°/+180°/−180°, +720°/+360°/−360°, etc. Examples of otherwise identical resulting phase are not limited to phase transitions that are multiples of 90°, and further include, for example, +52°/−308°, +132°/−228°, −27°/+333°, and the like. There are an infinite number of combinations of phase transitions that yield an identical resulting phase, and each of these may be distinguished by application of systems and methods in accord with aspects and embodiments described herein.

Accordingly, systems and methods described herein enable new manners of encoding information in an optical signal, because, for example, a +360° phase transition may be transmitted to have a different meaning than a −360° phase transition, and receivers using systems and methods described herein may distinguish (and allow proper interpretation of) such transitions. Accordingly, various encoding constellations, such as quadrature amplitude modulation (QAM) and the like, may take on extended meaning. A particular point on a constellation may indicate a different symbol based upon how the transmitter arrived at the constellation point. For example, a clockwise (negative) phase transition versus a counter-clockwise (positive) phase transition, or a phase transition that makes a full phase rotation (e.g., around a polar coordinate system) prior to arriving at the constellation point. Further, remote sensing and/or imaging systems may use optical signals to interact with objects to sense aspects of the object (e.g., size, speed, shape, direction, materials, etc.) and some interactions may create phase variations that are difficult to distinguish using traditional phase demodulation techniques, whereas systems and methods in accord with those described herein may be used to distinguish such otherwise equivalent phase transitions or variations.

In certain examples, a system includes two or more optical resonators, such as Fabry-Perot filter/resonators, fiberoptic loops, or fiberoptic micro-rings, which convert received phase-transitions into intensity variations at an output. In some examples, an output signal level may also indicate amplitude variations in a received signal. Accordingly, analysis of the intensity variations from two or more optical resonators may allow determination of various phase and amplitude transitions of a received optical signal, and thereby demodulate the received optical signal. Aspects and embodiments are directed to receivers that include such optical resonators as converter elements and/or include processing of resonator output signals to determine phase variations in the arriving optical signal.

Variation of output intensity from an optical resonator may depend on various parameters, such as changes in the arriving optical signal (e.g., phase, amplitude), optical length of the resonator (e.g., Fabry-Perot etalon, micro-ring), and a combination of absorption, reflection, and other characteristics of the optical resonator. Certain embodiments provide a demodulator that includes two or more etalons. In particular, according to certain embodiments, the use of three etalons, one of which may have an effective roundtrip length equal to an integer number of nominal wavelengths of the arriving optical signal (potentially also accounting for an angle of incidence) (e.g., the etalon is tuned), and the others being out of tune with the arriving optical signal, are sufficient for demodulation. Analysis of the outputs of the two or three etalons, e.g., by digital or other processing, permits the demodulation of phase variations in the arriving optical signal.

Aspects and embodiments described herein allow for demodulation of complex encoding formats using various optical resonators. This approach may eliminate the need for reference laser sources, fiber couplers, phase shifters, etc. in the receiver, while also reducing processing power and hardware requirements.

Optical signals may be phase and/or amplitude modulated via various sources and/or processes. A coherent optical signal, such as a laser beam, may be purposefully modulated by a data communications transmitter for instance, to encode communicated information on the optical signal. Numerous processes may phase and/or amplitude modulate a coherent light source, from which information about the process may be recovered by appropriate demodulation (e.g., interpreting) of the modulated optical signal. For example, various measurement systems may transmit an optical signal and analyze a reflected signal to determine dimensions, movement, defects, etc. Examples of various systems for which demodulation of phase and/or amplitude modulated optical signals may be beneficial include target designators, laser guidance systems, laser sight, laser scanners, 3D scanners, homing beacons and/or surveying systems, as well as communication systems. In some of these examples, an optical signal may arrive via a free space signal path (e.g., free space optical, FSO) or a fiber or other waveguide system. Systems and methods for demodulation of phase and/or amplitude modulated optical signals in accord with aspects and examples disclosed herein may be beneficially applied to any of the above-mentioned optical systems, or others, to receive, detect, recover, etc. useful information from an optical signal.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics. Accordingly, any suitable electromagnetic radiation capable of interacting with a suitable resonator in like manners to those described herein may be included in the terms light, light signal, optical, or optical signal. Further, the terms phase variation, phase transition, and phase shift are used interchangeably herein, unless clearly indicated otherwise by context.

In various embodiments, systems and methods are based on two or more optical resonators from which interpretation of their outputs may yield a determination of phase variations in an arriving optical signal. In some examples, a first resonator may provide information about an amount of a phase transition and another resonator may provide information about a direction (e.g., sign) of the phase transition. In other examples, two or more output signals from optical resonators may be analyzed/interpreted to determine an amount and direction of a phase shift without any particular resonator giving complete information about either of the amount or direction of the phase shift. In various embodiments, one or more of the resonators may be tuned to the arriving optical signal and others of the resonators may be detuned. In other embodiments, each of the one or more resonators may be detuned. Certain embodiments include two or more optical resonators, none of which are necessarily tuned to a precise wavelength, but the amount of detuning from the received optical signal wavelength may be distinguished based on the real-time output of the resonators. In various embodiments, the optical resonators do not have to be tuned to a precise transmission rate or a precise optical wavelength.

Accordingly, aspects and embodiments disclosed herein may eliminate the need for synchronization of a reference laser wavelength, eliminate the need for lasers to serve as local oscillators, eliminate problems associated with polarization drift in optical fibers, reduce the number of detectors needed to account for polarization effects, reduce the amount of processor and/or DSP complexity required for high order coherent demodulation, and/or permit variable transmission rate with the same hardware, rather than requiring a precise optical delay, e.g., to correspond to a transmission rate.

FIGS. 1A-1F illustrate examples of phase transitions that may be applicable to various modulation schemes and/or interactions of an optical signal with an object, or other processes that may modulate an optical signal. For example, a reference point 110 on a polar coordinate chart may represent a starting position (prior to a phase transition) of an optical signal. An optical signal at point 120 represents an optical signal having a certain amplitude, A, and phase, Φ. A transition from one point to another point, such as from the 0° reference point 110 of FIG. 1A to the point 120, may include a change in amplitude, a change in phase, or both.

Demodulation of an arriving optical signal in accord with aspects and embodiments herein may determine characteristics of a path the optical signal takes through the constellation (e.g., around the polar coordinate system), to determine additional information beyond simply which point in a constellation is currently occupied by the optical signal. Aspects and embodiments described herein are directed to determining aspects of the phase variation, but application of the concepts in accord with the systems and methods described may also be applied to determine aspects of amplitude variation that, together with phase variation, may identify an optical signal's path within a polar coordinate system.

FIG. 1B illustrates two examples of phase transitions that may occur when an optical signal changes from the reference point 110 to a new point 130, having a phase of 180° relative to the 0° phase of the reference point. The optical signal may go counter-clockwise, increasing in phase (e.g., a phase advance) through a phase transition 132 of $\Delta\varphi=+180°$, or the optical signal may go clockwise, decreasing in phase (e.g., a phase retreat) through a phase transition 134 of $\Delta\varphi=-180°$. Each of the two phase transitions 132, 134 arrive at the same point 130. Other phase transitions may also arrive at the point 130, such as a ±540° from the reference point 110, and others. Conventional phase demodulation methods that operate based upon the final state of the optical signal (e.g., at point 130), relative to the prior state of the optical signal (e.g., at point 110), are unable to distinguish between the two different phase transitions 132, 134. Aspects and embodiments in accord with the systems and methods described herein, however, involve the arriving optical signal interacting with an optical resonator during the phase transition, allowing determination of whether the phase transition 132 of +180° (e.g., a phase advance) or the phase transition 134 of −180° (e.g., a phase retreat) occurred, and/or involve analysis of output signals from an optical resonator to determine which occurred.

Figure 1D:
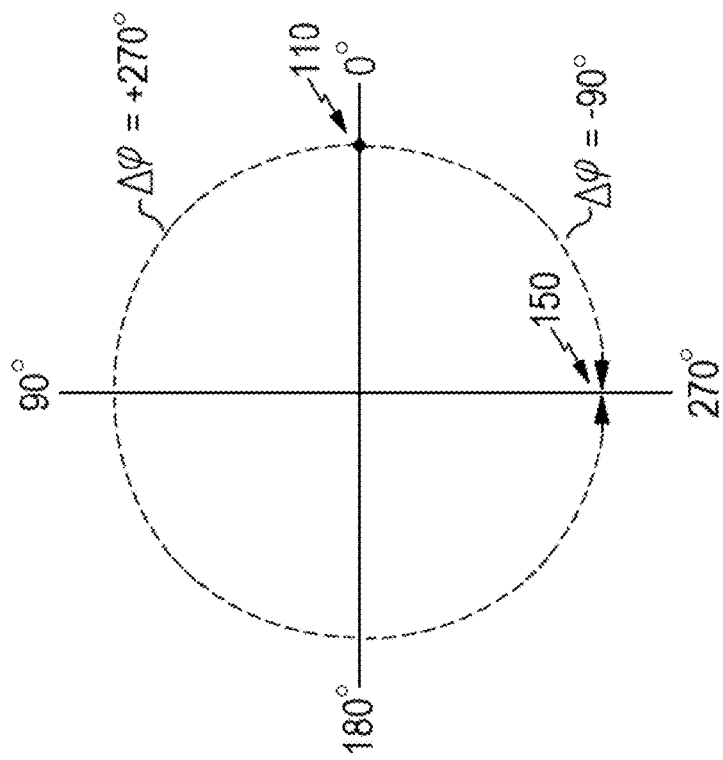
Figure 1C:
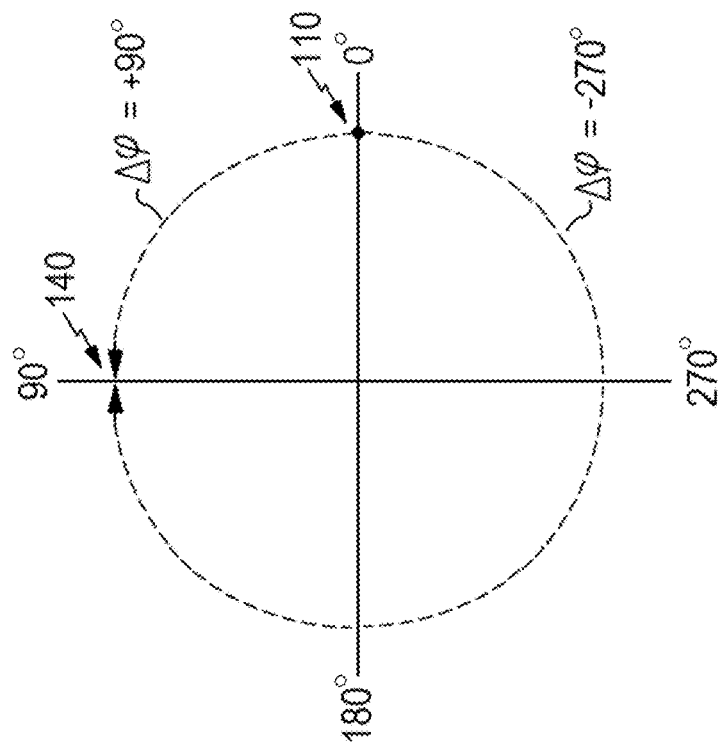
Figure 1F:
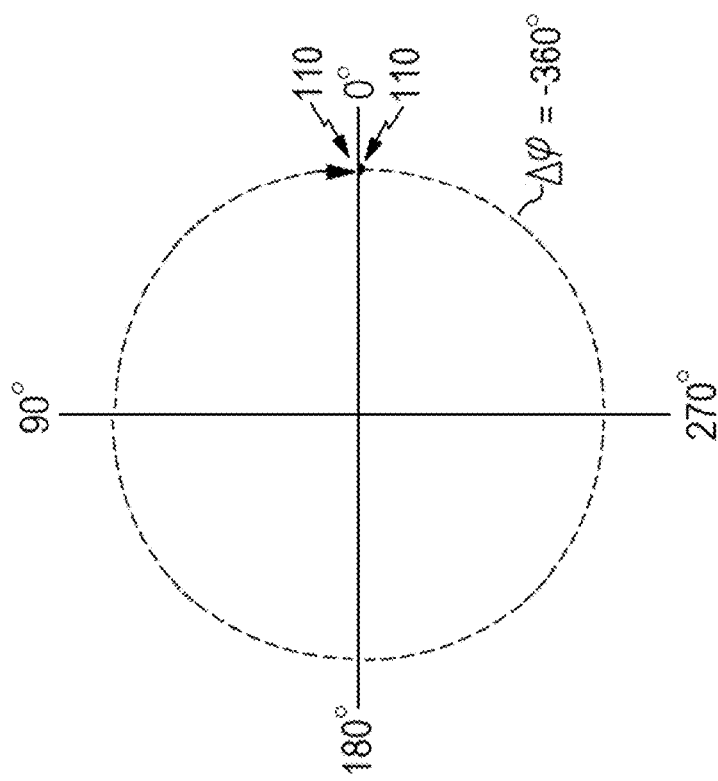
Figure 1E:
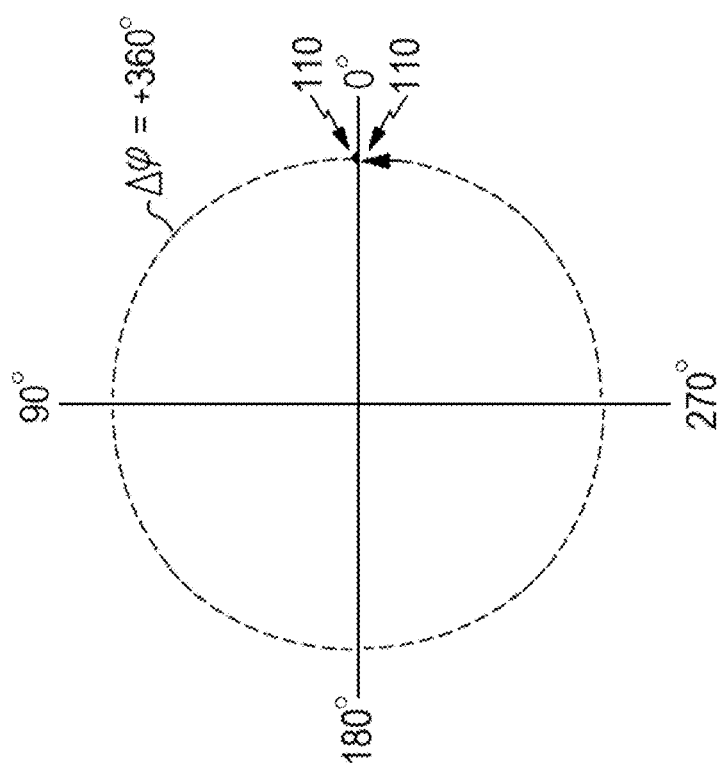

FIG. 1C illustrates a point 140 that also may be reached by multiple different phase transitions, e.g., a +90° phase transition or a −270° phase transition, or others. Similarly, FIG. 1D illustrates a point 150 that may be reached by multiple different phase transitions, e.g., a +270° phase transition or a −90° phase transition, or others. FIG. 1E illustrates a phase transition of +360° that an optical signal may take (counter-clockwise) to return to the reference (starting) point 110, and FIG. 1F illustrates a phase transition of −360° that an optical signal may take (clockwise) to return to the reference (starting) point 110. A conventional receiver may not be able to distinguish the phase transitions shown in FIGS. 1E and 1F, or may not even detect that a phase transition occurred, at least because the final state of the arriving optical signal is identical to its original state. Aspects and embodiments in accord with the systems and methods described herein, however, detect characteristics of the arriving optical signal through (during) the phase transition and are capable of distinguishing a +360° phase transition from a +360° phase transition, and are further capable of determining larger phase transitions (in excess of 360°).

Any point on a constellation or polar coordinate system may be reached by more than one phase transition, and an infinite number of phase transitions are available to reach any point. Systems and methods in accord with those described herein are capable of distinguishing sets of differing phase transitions that would otherwise be equivalent when evaluated solely upon the starting and final characteristics of the optical signal.

Phase transitions in an arriving optical signal interacting with an optical resonator may cause transient disturbances in an output signal from the optical resonator. The transient disturbance in the output signal of each of two or more optical resonators, in response to a phase transition in an arriving optical signal, may be analyzed in accord with the methods described to determine details of the phase transition, examples of which are described above.

Figure 2:
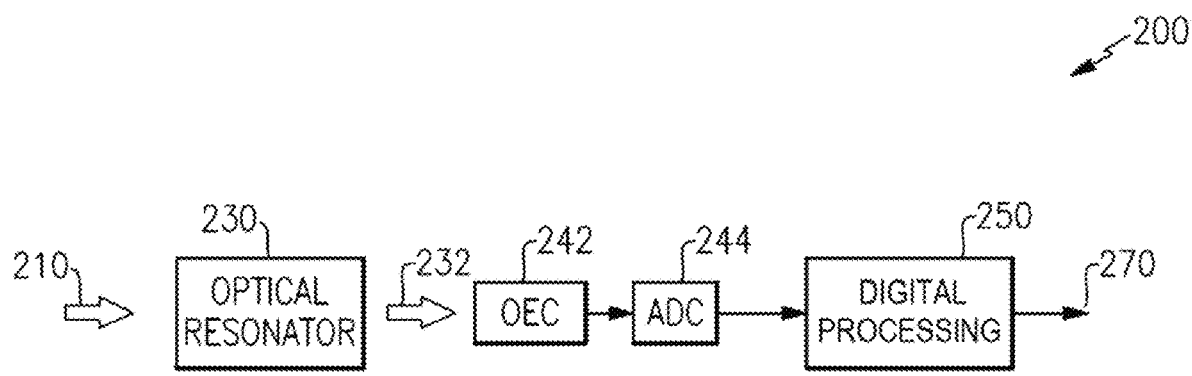
FIG. 2 is a block diagram of an optical receiver according to various examples described herein.

FIG. 2 illustrates an example of an optical receiver 200 according to various examples discussed herein. The illustrated receiver 200 receives an optical signal 210 and includes an optical resonator 230 and a digital processing subsystem 250 that provides an output 270. The optical resonator 230 may be coupled to the digital processing subsystem 250 by an optical-electrical converter 242 and an analog to digital converter 244, for example.

Examples of optical resonators 230 may include Fabry-Perot etalons, micro-rings, or other types of resonators. The optical resonator 230 is a component capable of sensing transitions, such as phase transitions, representative of modulation of the received optical signal 210, and transforming the transitions into intensity modulation of an output optical signal, e.g., output optical signal 232. The optical resonator 230 converts the modulation of the arriving optical signal 210 in part by interaction of the arriving optical signal 210 with optical signal energy built-up or held in the optical resonator 230.

An optical signal received by an optical resonator 230 may establish a steady-state energy-conserving condition in which optical signal energy continuously arrives at the resonator, accumulates or adds to built-up energy existing inside the resonator, and emerges from the resonator at a constant rate. A change in the arriving phase, frequency, or amplitude of the optical signal may disrupt the steady-state condition, and the light intensity emerging from the resonator is thereby disrupted, until a steady state condition is re-established. Accordingly, a change in phase, frequency, or amplitude of the arriving optical signal 210 causes a change in intensity of the emerging optical signal 232. A large phase transition in the arriving optical signal 210, for example, may cause a large (but temporary) intensity change in the emerging optical signal 232. Similar operation may occur in various resonator types, such as an etalon, optical loop, micro-ring, or other optical resonator. Accordingly an optical resonator 230 functions as a demodulator, or a modulation converter, for an optical signal 210. The emerging optical signal 232 may therefore carry the same information content as the arriving optical signal 210, but in intensity modulated form.

The emerging intensity-modulated optical signal 232 may be converted to an electrical signal by an optical-electrical converter, e.g., OEC 242, which may include a photodetector, such as a photodiode, for example. Accordingly, the output of the OEC 242 may be an amplitude modulated signal representative of the intensity-modulated optical signal 232, and may be converted to a digital form by an analog to digital converter, e.g., ADC 244. The digital signal is provided to the digital processing subsystem 250 for digital processing. The digital processing subsystem 250 processes the digital signal to retrieve the information-carrying content of the optical signal 210.

In various examples, a receiver in accord with aspects and examples disclosed herein may include additional or fewer optics than discussed above, and may omit or add various components relative to those discussed above. For example, focusing optics may be included to receive the emerging optical signal 232 from the optical resonator 230 and to focus the optical signal 232 onto the OEC 242. Certain examples may use analog receiver circuitry and therefore may omit the ADC 224. Various examples may include a channel estimator as part of the digital processing subsystem 250 to provide phase rotation or other signal adjustments as may be known in the art.

Figure 3:
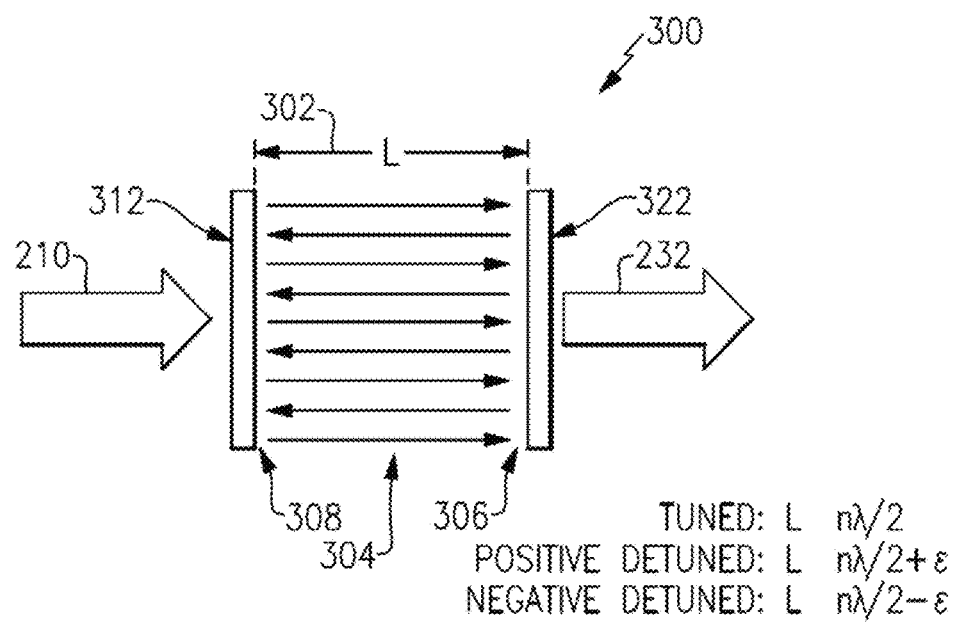
FIG. 3 is a schematic diagram of an example of an optical resonator.

As discussed above, suitable optical resonators may include etalons, micro-rings, or other structures. Some detail of at least one example of an etalon is discussed with respect to FIG. 3, which illustrates an example of an etalon 300 that may be used as an optical resonator 230 in accord with aspects and embodiments described herein. In particular, the etalon 300 may be used to convert phase modulations of the received optical signal 210 into intensity or amplitude modulations of the output optical signal 232. The intensity or amplitude modulated output optical signal 232 may then be converted to an electrical signal in some embodiments, as discussed above. The etalon 300 exhibits output intensity variations in response to phase transitions in the received optical signal 210.

The etalon 300 includes an interior 304 with semi-reflective surfaces 306, 308 that reflect optical signal energy into the interior 304. An input side 312 allows optical signal energy, such as the optical signal 210, into the interior 304. The input side 312 thereby forms an aperture through which the arriving optical signal 210 is received. An output side 322 forms an optical output, at least in part by action of the semi-reflective surface 306 to allow a portion of trapped optical signal energy from the interior 304 to emerge as an output optical signal, such as the output optical signal 232. Accordingly, the semi-reflective surface 306 is also semi-transmissive, such that optical signal energy arriving (from the interior 304) at the semi-reflective surface 306 is partially reflected back to the interior 304 and partially transmitted through to the output side 322. The etalon 300 may have varying levels of reflectivity of the semi-reflective surfaces 306, 308. In certain examples, the reflectivity may be expressed as a fraction of light amplitude reflected back into the interior 304, or may be expressed as a fraction of light intensity reflected back into the interior 304. In a particular example, an amplitude reflectivity of the first semi-reflective surface 308 may be r1=0.999 and an amplitude reflectivity of the second semi-reflective surface 306 may be r2=0.985. In other examples the reflectivity of each of the first and second semi-reflective surfaces may be different, and may be any suitable value for a particular implementation. In various examples illustrated by FIGS. 4-5, each of the reflective surfaces 306, 308 may have intensity reflectivities of r1=r2=0.707, such that about 70% of the optical energy is reflected (or in various examples, 50% to 85% or more is reflected), at each interaction with either of the reflective surfaces 306, 308. In other examples any suitable reflectivities may be established by varying design criteria. The etalon 300 is one example of a suitable optical resonator in accord with aspects and embodiments described herein.

The use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like.

Optical resonators herein include structures of conventional characteristics as well as structures that may include interior reflectivity in a range of 50% to 85% or more, which may be relatively low as compared to conventional examples, which may have reflectivity in a range of 95% to 98% or greater. In various embodiments, optical resonators with relatively low reflectivity values may exhibit more transient modal characteristics, as compared to optical resonators with relatively high reflectivity values which may exhibit a stronger steady-state mode.

In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

In various embodiments, an optical loop or a micro-ring may also be a suitable optical resonator, formed of one or more waveguides in which at least one is a closed loop such that optical signal energy traversing "around" the loop may be phase aligned with a dimension of the loop at one or more wavelengths. Accordingly, optical signal energy traversing the loop may constructively or destructively interfere with itself, at certain frequencies (wavelengths), and such constructive or destructive interaction may be disturbed by a phase change in an arriving optical signal. Accordingly phase and amplitude changes in the arriving optical signal may be detected and interpreted to demodulate the arriving optical signal. Similarly, the etalon 300 traps or stores some optical signal energy such that optical signal energy traversing the etalon may constructively or destructively interfere with itself in similar manner.

According to certain examples, an optical resonator, such as the etalon 300, will develop a steady-state output signal based on the input signal, and maintain a given level of output signal until a modulation of the input signal occurs. When a phase modulation occurs in the input signal, self-interference (constructive or destructive) may cause a phase-dependent transient disturbance in the intensity of the output signal. Such a transient disturbance may depend upon the tuning of the etalon (or other optical resonator), as discussed in more detail below. Accordingly, an etalon 300 may have various states of tuning, relative to a received optical signal wavelength, $\lambda$, angle of incidence, or other factors. For example, a tuned etalon may have an optical interior dimension 302 (e.g., based upon the speed of light in the material of the interior 304) that is an integer number of half-wavelengths, e.g., $L=n\lambda/2$. A detuned etalon may be positively detuned by having a slightly larger dimension, e.g., $L=n\lambda/2+\epsilon$, or be negatively detuned by having a slightly smaller dimension, e.g., $L=n\lambda/2-\epsilon$. In some embodiments, the dimensional variant, $\epsilon$, may have a nominal value of one eighth wavelength, e.g., $\epsilon=\lambda/8$. In other embodiments, the dimensional variant may have a nominal value of a tenth of a wavelength, e.g., $\epsilon=\lambda/10$, or a twelfth of a wavelength, $\epsilon=\lambda/12$. Other embodiments may have different nominal dimensional variants, $\epsilon$, and any dimensional variant, $\epsilon$, may be more or less precise in various embodiments.

A positively detuned optical resonator with respect to a particular wavelength or angle of incidence may be a negatively detuned optical resonator with respect to another wavelength or angle. In some embodiments, tuning relative to a particular wavelength may be less significant than a difference in tuning between two or more optical resonators. For example, the positively and negatively detuned resonator dimensions discussed above may be equivalently described with respect to two optical resonators as being detuned by 2ε relative to each other, without regard to what wavelength might produce resonance in either of the optical resonators. Further details of the operation of a tuned resonator, and of detecting and demodulating phase modulations using a tuned resonator alongside a detuned resonator, may be found in co-pending U.S. patent application Ser. No. 15/725,457 filed on Oct. 5, 2017, and titled SYSTEMS AND METHODS FOR DEMODULATION OF PSK MODULATED OPTICAL SIGNALS, and in U.S. patent application Ser. No. 15/816,047 filed on Nov. 17, 2017, and titled DEMODULATION OF QAM MODULATED OPTICAL BEAM USING FABRY-PEROT ETALONS AND MICRORING DEMODULATORS, each of which is herein incorporated by reference in its entirety for all purposes.

As discussed above, various phase transitions may not be detectable by systems that determine the phase transition based upon an initial and final state of an arriving optical signal, because an arriving optical signal may undergo any of various phase transitions to arrive at a particular final state from a particular initial state. Accordingly, a variety of different phase transitions are discussed with reference to FIGS. 4 and 5, with a focus on how systems and methods herein may distinguish between the different phase transitions.

Figure 4:
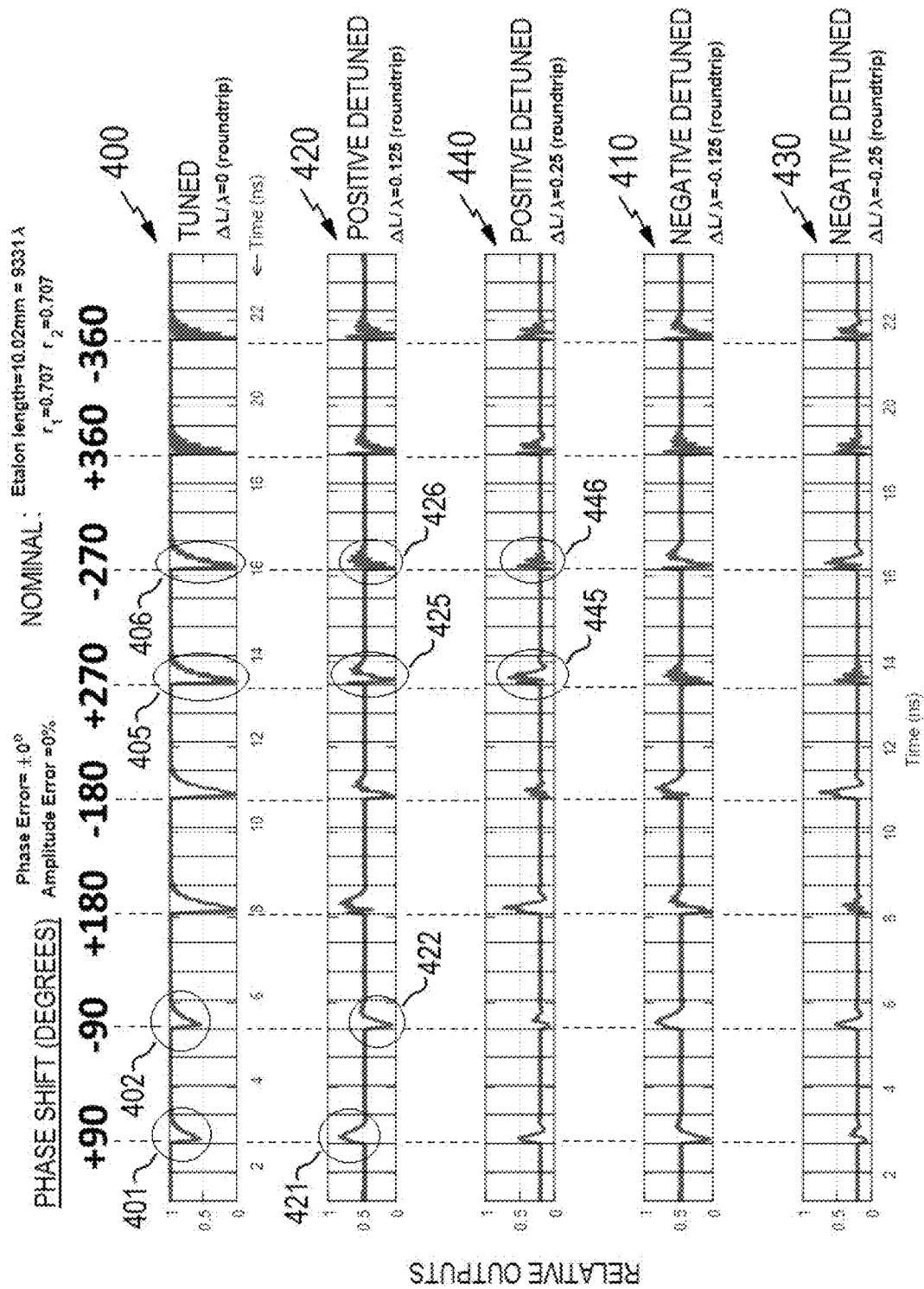
FIG. 4 is a set of output signal graphs from multiple optical resonators.

FIG. 4 illustrates a number of output optical signal intensities from various tuned and detuned etalons, e.g., such as the etalon 300, in response to various phase transitions in an arriving optical signal. Equivalently, the graphs in FIG. 4 may represent an electrical signal output of an ideal optical-electrical converter, e.g., a photodetector having sufficiently high bandwidth to reproduce details of the optical signal, indicating the optical signal intensity at each of the etalons' outputs. The graph 400 represents the output signal of a tuned etalon. The graphs 420, 440 each represent an output of a positively detuned etalon, the graph 440 representing that of a more positively detuned etalon than the graph 420. The graphs 410, 430 each represent an output of a negatively detuned etalon, the graph 430 representing that of a more negatively detuned etalon than the graph 410.

The various graphs of FIG. 4 illustrate that various tuned and detuned etalons may have varying responses to otherwise identical phase transitions in an arriving optical signal. For example, a tuned etalon may have a response 401 that is a temporary reduction in output in response to a +90° phase transition in the arriving signal, while a positively detuned etalon may have a response 421 that is a temporary increase in output in response to the same +90° phase transition. The tuned etalon may have a response 402 to a −90° phase transition that is similar to the response 401 for a +90° phase transition, but any of the detuned etalons may provide a response (e.g., response 422) to the −90° phase transition different from their respective responses to the +90° phase transition. Accordingly, in some embodiments, a tuned optical resonator may indicate a phase transition of a certain magnitude while a detuned optical resonator may provide a varying response to indicate whether the phase transition is positive or negative.

FIG. 4 also illustrates that some phase transitions of larger magnitude, such as the ±270° phase transitions, may cause larger transient disturbances (e.g., in terms of time and/or amplitude response), such as in the responses 405, 406 as compared to the responses 401, 402. Accordingly, a phase transition of larger magnitude may be distinguished by the transient disturbance it causes. A phase transition of differing direction, such as a +270° phase transition and a −270° phase transition, may be distinguished by the responses of at least one other optical resonator, such as by the responses 425 and 426 or by the responses 445 and 446.

In various embodiments, a signal representative of the output of an optical resonator (e.g., in response to a phase transition) may be provided to a photodetector whose electrical output may not reproduce all the details from the output optical signal, e.g., a real-world photodetector has finite bandwidth, such that the electrical output of the photodetector may be equivalent to a low pass filtered version of the signals in FIG. 4. Examples of electrical output signals from a photodetector having finite bandwidth, corresponding to the optical signals of FIG. 4, are shown in FIG. 5.

In conventional systems, photodetectors in optical receivers are typically required to provide a bandwidth of 2 to 4 times a baud rate. Accordingly, a 1 GB/s optical link may use a photodetector capable of 2-4 GHz bandwidth. Various higher data rates may require higher baud rates, and thereby require higher bandwidth photodetectors in conventional receivers, at higher costs and stricter requirements placed upon other characteristics, such as optical alignment tolerance. Accordingly, conventional receivers are not available for data rates over 40 GB/s, which conventionally require photodetectors with 100-200 GHz. However, systems and methods in accord with aspects and embodiments herein provide detection of higher baud rates with lower bandwidth photodetectors than conventional receivers.

Figure 5:
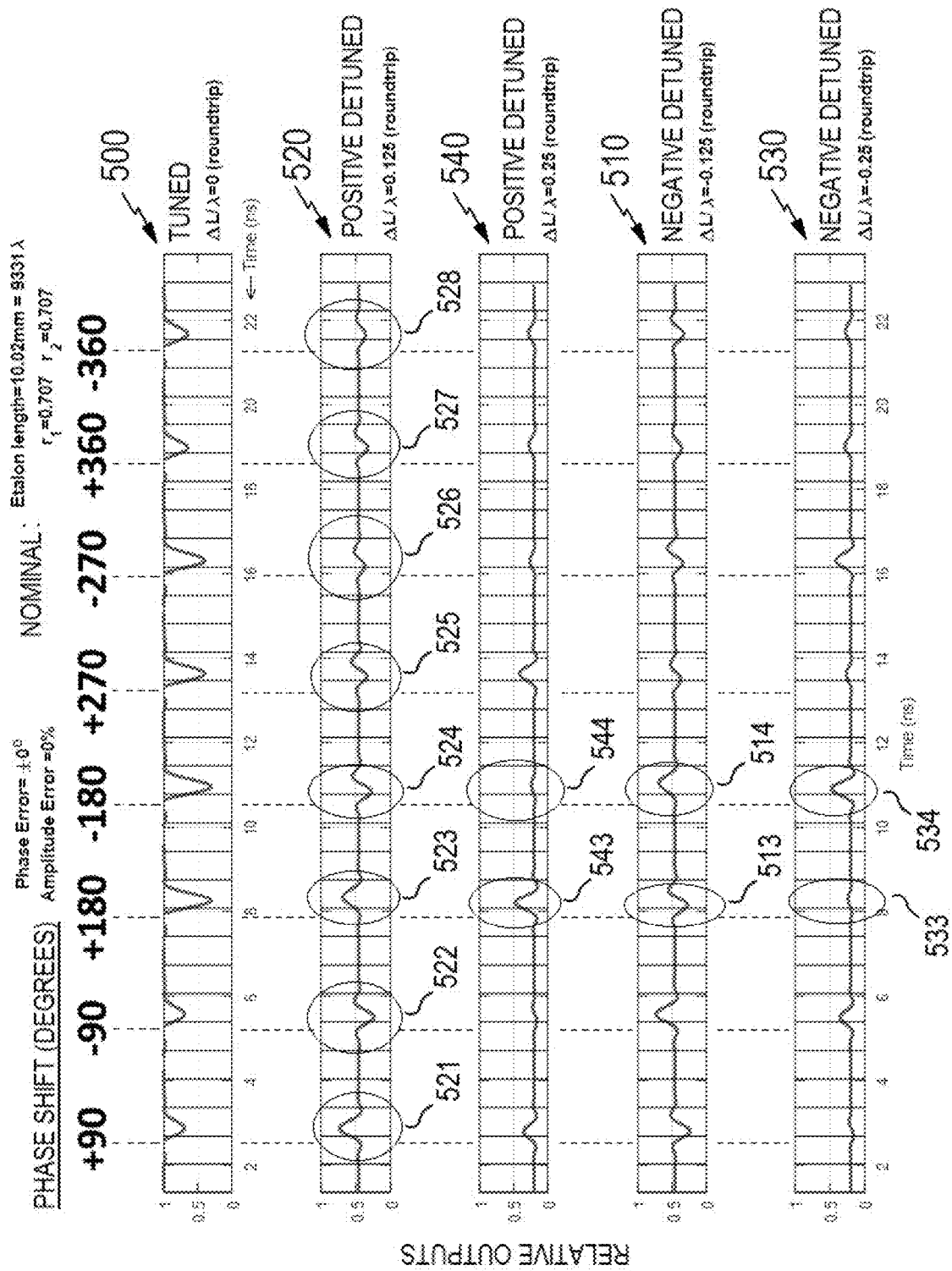
FIG. 5 is a set of filtered output signal graphs from multiple optical resonators.

FIG. 5 illustrates a number of output signals, similar to those of FIG. 4, from various tuned and detuned etalons, except that the signals of FIG. 5 represent output signals from, e.g., a photodetector having finite bandwidth. In various embodiments, a photodetector may have significantly less bandwidth than twice a baud rate, and yet be effective to produce signals similar to those in FIG. 5. Accordingly, systems and methods herein allow demodulation of higher baud rates with relatively low bandwidth photodetectors as compared to conventional systems.

In a first example, a +180° phase transition and a −180° phase transition may be distinguished by the response of any of the detuned optical resonators. Such as by the distinct responses 523 and 524, or the distinct responses 543 and 544, or the distinct responses 513 and 514, or the distinct responses 533 and 534. Any of various alternate detuned optical resonators may also provide responses that distinguish +180°/−180° phase transitions.

In a second example, a +270° phase transition and a −90° phase transition may be distinguished by the response of a tuned resonator or the response of any of the detuned resonators. In some embodiments, a single optical resonator may provide responses sufficient to distinguish phase transitions of +270°, −90°, −270°, and +90°. For example, the responses 521, 522, 525, and 526 are each unique such that analysis of any one, or comparison of one to another, may provide sufficient information to identify which phase transition occurred. In some embodiments, analysis of output signals from one or more additional optical resonators may confirm the identified phase transition, e.g., increase the sensitivity of the receiver, reduce erroneous detections.

In a third example, a +360° phase transition and a −360° phase transition may be detected and distinguished by the response of any of the detuned optical resonators. Such as by the distinct responses 527 and 528. For example, some of the distinguishing characteristics include: (1) the response 527 has an initial upward response (increasing amplitude) that is absent or less prevalent in the response 528, (2) the response 527 decreases in amplitude more than the accordant decrease in the response 528, and (3) the response 527 overshoots a return to steady state more so than does the response 528. Other distinctive features of the response 527 may be identifiable in comparison to the response 528 in various embodiments. Additionally, any of various alternately detuned optical resonators may also provide responses that distinguish +360°/−360° phase transitions, and/or the responses of multiple optical resonators may be processed and compared to increase a ratio or confidence in a distinguishing one phase transition from another.

Accordingly, new ways of encoding information in phase modulation are enabled by the systems and methods herein. For example, using varied phase transitions that might otherwise be redundant (e.g., resulting in an identical final state of the arriving optical signal, relative to the initial state), such as +180°/−180° or +270°/−90° or +360°/−360° for example, may separately indicate distinct information symbols. Alternately stated, differing directions (advance, retreat) of otherwise identical phase transitions may be used to send additional information, carry additional binary digits, indicate different symbols, etc.

Similarly, various distinctions between two or more optical resonators may be identifiable to detect phase transitions larger than 360°, further providing new ways of encoding information in phase modulation by the systems and methods herein. It should be noted that conventional systems may not even detect that a +360° phase transition or a −360° phase transition has occurred, because the final state of the arriving optical signal after such a phase transition is unchanged from the initial state. In at least a second modality, phase transitions greater than a full rotation may be identified and distinguished, such as +720°/+360° or +810°/+450°/+90° for example, and may be used to separately indicate distinct information symbols. Each of these example phase transitions, and numerous other suitable phase transitions, may be used in a receiver or phase detector to distinguish characteristics of an arriving optical signal that conventional receivers may not detect and/or distinguish.

In some embodiments, two optical resonators may be included. For example, a magnitude of response of a tuned resonator may provide information about the magnitude of a phase transition, and a detuned resonator may provide information about the direction of the phase transition. In other examples, additional optical resonators may be included to provide signal responses having more distinct features, e.g., to confirm a detection and/or distinction between two phase transitions that may otherwise cause similar responses by any of the optical resonators.

In various embodiments, an output signal from an optical resonator, which may be optionally converted to an electrical signal, optionally filtered to remove or to distinguish certain features, and optionally converted to a digital form, may be analyzed for various characteristics of its response to a phase transition. For example, such characteristics may include, but are not limited to, a magnitude of response, slope of response, initial direction (increase/decrease), peak value(s), subsequent directions and magnitudes, overshoot and/or settling characteristics (e.g., return to steady-state), duration, etc. No particular characteristic may be necessarily required for all embodiments, but rather any embodiment may exhibit various characteristics upon which a processing system may be configured or programmed to distinguish and determine various phase transitions to accommodate differing system requirements and/or operating environment.

With benefit of this disclosure, any number of phase transitions may be detected, distinguished, and uniquely identified by a suitable number of optical resonators having varying tuned states relative to an arriving optical signal, and by sufficient processing resources to analyze the various response signals output by the optical resonators. Accordingly, a communication or sensing system receiver may be designed for any desired constellation of phase transitions or for any optical phase resolution of a sensing system (e.g., to accommodate expected modulations of an optical signal via an interaction with an object, environment, etc.).

With continued reference to the above described responses of tuned and detuned optical resonators, with respect to phase transitions in an arriving optical signal, a general phase transition of any size and direction may be detected and distinguished by a combination of any two optical resonators, at least one of which is detuned from the wavelength of the arriving optical signal. In some examples, a magnitude of phase transition may be determined by the amount of reduction in output signal intensity from a tuned optical resonator and a direction of the phase transition (advance or retreat) may be determined by analyzing the output signal from a detuned optical resonator.

Additionally, analysis of the output optical signals from two or more optical resonators may identify whether either is tuned (resonant) (e.g., relatively high output intensity, similar response to both positive and negative phase transitions) and/or detuned. Further, a received optical signal that drifts in wavelength may cause a tuned optical resonator to become a detuned optical resonator, and vice-versa, and a processing subsystem, such as the digital processing subsystem 250 of FIG. 2, may be configured (e.g., programmed) to analyze output intensities from two or more optical resonators to determine whether they are detuned or whether one is tuned, and interpret the output signals accordingly. While distinction of any general phase transition is achievable by systems and methods described herein having only two optical resonators, various embodiments may operate more robustly having three or more resonators, for example. Accordingly, to account for an arriving optical signal having a general wavelength, or to account for an arriving optical signal subject to wavelength drift or variation, or to account for dimensional changes of the optical resonators, e.g., due to temperature, manufacturing tolerance, or the like, certain embodiments may include three or more optical resonators each having an optical dimension different from the others by some amount, such as but not limited to, a fixed dimensional variant, ε, as described in more detail below with respect to FIG. 7.

Accordingly, any general phase transition may be determined by systems and methods as described above. In some embodiments, one or more optical resonators and/or photo-detectors may provide an output optical signal that is used for determining both phase transitions and amplitude transitions in an arriving optical signal.

For each of a tuned optical resonator, a positively detuned optical resonator, and a negatively detuned optical resonator, a change in amplitude of the arriving optical signal (e.g., an amplitude transition) may cause an output intensity from the resonator to settle at a new steady-state level. Accordingly, steady-state output intensities may be detected to determine amplitude transitions in the arriving optical signal in some embodiments.

In accord with all the above, variation in emerging light intensity from an optical resonator, such as the etalon 300 or a micro-ring, indicates that a transition occurred in an arriving optical signal, such as a phase or amplitude variation, and such may be used by appropriate signal processing to determine useful information by analyzing the emerging light intensity. Accordingly, appropriate processing of the intensity modulated output optical signals from two or more optical resonators, in electrical form in some examples, and optionally in digital form, may interpret the intensity variations to determine amplitude and phase transitions of an arriving optical signal.

Figure 6A:
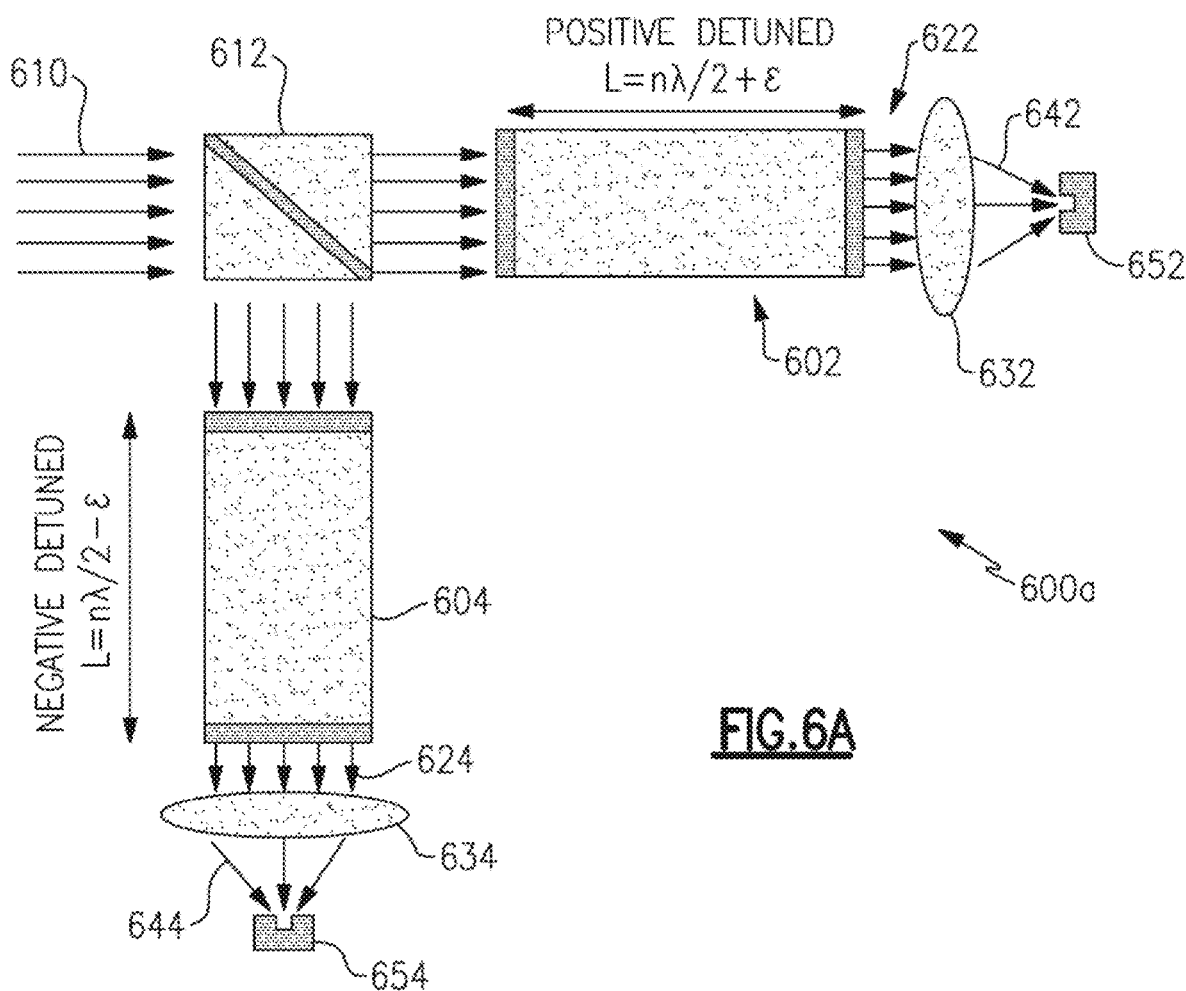
FIGS. 6A-6B are schematic diagrams of examples of optical receiver portions utilizing optical resonators.
Figure 6B:
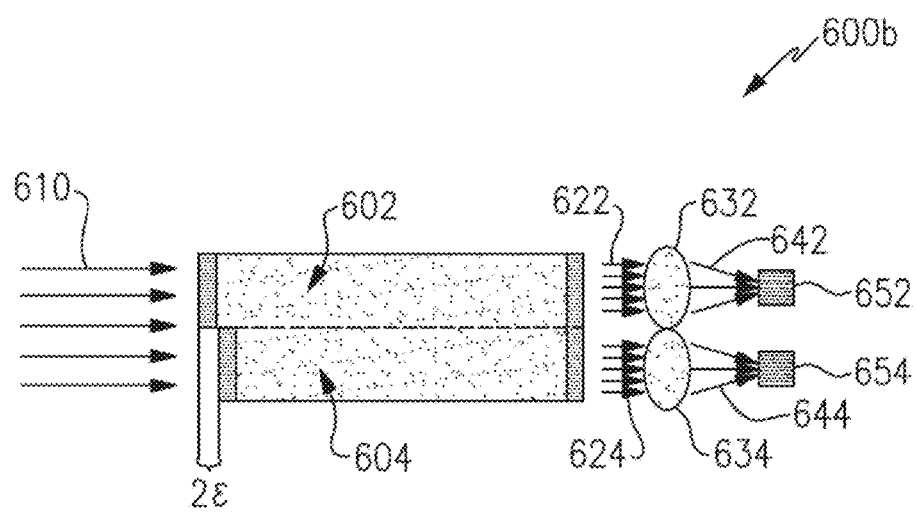

FIG. 6A illustrates an optical system 600a and FIG. 6B illustrates an optical system 600b, each of which may operate as combination optical resonators to allow detection and demodulation of phase transitions having various magnitude and direction. Each of the optical systems 600 shown includes a positively detuned resonator 602 and a negatively detuned resonator 604, that are etalons as shown but may be other forms of optical resonators as previously described. In other examples, one of the resonators 602, 604 may be a tuned resonator. In the case of the optical system 600a, an arriving optical signal 610 is split by a splitter 612 such that a portion of the arriving optical signal 610 arrives at the positively detuned resonator 602 and another portion arrives at the negatively detuned resonator 604. In the optical system 600b, various portions of an arriving optical signal 610 arrive at each of the positively detuned resonator 602 and the negatively detuned resonator 604 without a splitter. Each of the positively detuned resonator 602 and the negatively detuned resonator 604 operates as previously discussed.

Each of the positively detuned resonator 602 and the negatively detuned resonator 604 receives a portion of the arriving optical signal and, as discussed, converts phase and amplitude transitions into intensity modulations of respective output optical signals 622, 624. The output optical signals 622, 624 may be focused to varying extent by respective optics 632, 634 (e.g., lens 632, 634), in some examples, to provide focused output optical signals 642, 644. In other examples the output optical signals 622, 624 may not be focused. Either of the output optical signals 622, 624 or the focused output optical signals 642, 644 may be provided to a respective optical-electrical converter 652, 654, which may be a photodetector, such as a photodiode, as discussed previously, to convert the intensity modulated output optical signal energy into an electrical signal, which may further be converted to a digital format, also as discussed previously. Intensity variations in the output optical signals 622, 624 and/or amplitude variations in an electrical signal output by the converters 652, 654, may accordingly indicate phase and amplitude transitions in the arriving optical signal 610. As discussed above, the positively and negatively detuned resonators 602, 604 may differ from a tuned resonator in an optical dimension by an amount, ε, that may be an eighth of a wavelength, a tenth of a wavelength, or another amount. In some embodiments, the positively and negatively detuned resonators 602, 604 may differ from each other by an amount, 2ε, without regard to a tuned resonator, e.g., one of the detuned resonators 602, 604 may be closer to resonance (e.g., more nearly tuned), with respect to the wavelength of the arriving optical signal 610, than the other.

Figure 7:
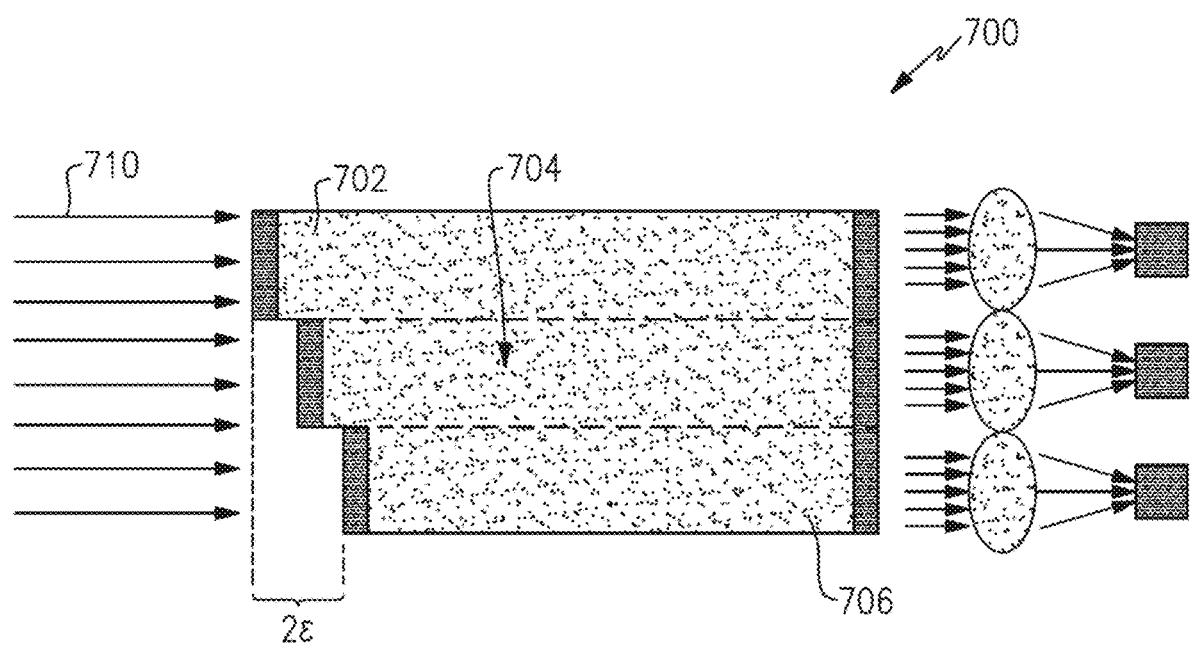
FIG. 7 is a schematic diagram of another example of an optical receiver portion utilizing optical resonators.

FIG. 7 illustrates an optical system 700 having three optical resonators 702, 704, 706, each of which is configured to receive a portion of an arriving optical signal 710. In some embodiments, the optical signal 710 may be split by a splitter similar in manner to FIG. 6A, to provide a portion to each of the optical resonators 702, 704, 706. In some embodiments, each of the optical resonators 702, 704, 706 may have an associated focusing optic and/or respective optical-electrical converter, as shown. In some embodiments, one of the optical resonators 702, 704, 706 may be tuned. In other embodiments, none of the optical resonators 702, 704, 706 may be tuned. The arriving optical signal 710 may, in some instances, be somewhat unstable and may have variation or drift in wavelength thereby causing one or other of the optical resonators 702, 704, 706 to enter a tuned state relative to the arriving wavelength at various times. Additionally, changes in temperature may cause variations in dimensions of one or more of the optical resonators 702, 704, 706 that shift one or more of the optical resonators 702, 704, 706 toward or away from a tuned state. In some embodiments, a difference between the most positively detuned resonator and the most negatively detuned resonator may be established as a nominal dimensional variant, 2ε, where ε may equal various values to accommodate varying operational requirements. In some embodiments, ε may nominally equal an eighth of a wavelength or a tenth of a wavelength. In various embodiments, ε may nominally equal a fraction of a wavelength in the range of a half wavelength to a sixteenth of a wavelength or less. In some embodiments, the optical resonators 702, 704, 706 may be etalons. In some embodiments, the optical resonators 702, 704, 706 may be optical loops or micro-rings, and ε may have differing nominal value for an optical loop or micro-ring embodiment relative to an etalon embodiment. Various embodiments may include additional optical resonators of nominally tuned or detuned dimension to accommodate a range of potential desired arriving optical signals, or a range of fluctuation of a desired arriving optical signal, having varying wavelengths, or any combination thereof. In various embodiments including multiple optical resonators, a dimensional difference between the resonator with the largest optical dimension and the resonator with the smallest optical dimension may be a fraction of a wavelength, or may be on the order of a wavelength or multiple wavelengths, to accommodate varying applications and/or operational parameters. In each of these various embodiments, intensity modulation of output optical signals from the respective optical resonators may each be analyzed, e.g., by a processing subsystem, to demodulate phase and amplitude modulations of a general optical signal in accord with the systems and methods described above.

Advantages of the aspects and embodiments described herein are numerous. For example, optical components may be lower cost or less complex than those required for conventional systems, such as allowing for coated or uncoated glass rather than crystal or expensive coatings. Use of optical resonators, such as etalons, for converting phase modulation into intensity modulation, may be advantageously designed to incorporate filtering (e.g., rejection of unwanted signals, via resonant dimensions, for example) which may provide improved signal-to-noise characteristics. Aspects and embodiments in accord with those described herein may satisfactorily operate in extreme aberration or turbulence in which adaptive optics would fail. Further, aspects and embodiments in accord with those described herein may achieve free-space optical reception with low size, weight, power, and cost requirements, improving support for platforms such as unmanned aerial vehicles and microsatellites.

It should be appreciated that the variation to output intensity caused by modulation of an arriving light signal may vary with resonant physical dimensions of an optical resonator, such as the dimensional length of an etalon or micro-ring, and how accurately it is manufactured, e.g., how well tuned the etalon is to one or more wavelengths. Output intensity from a tuned etalon with a smaller dimensional length is more quickly disrupted by a transition in the input signal, and more quickly re-establishes a steady state after such a transition, relative to a tuned etalon with a larger resonant dimension. Additionally, an etalon manufactured to a more accurate tolerance, i.e., more accurately tuned to the particular wavelength, may provide a higher steady-state output signal intensity and may exhibit greater sensitivity to transitions in input signals, relative to an etalon manufactured to a less accurate tolerance.

Various embodiments may have various etalon dimensions and tolerances based upon particular design criteria and to accommodate varying operational characteristics. In some examples, various etalon dimensions and tolerances may be selected to trade off, or balance, how strongly and/or how quickly the etalon responds to transitions in an arriving optical signal, and how quickly and/or how strongly the etalon approaches a return to steady-state after a transition. Additionally, various etalon dimensions and tolerances may be selected to optimize a receiver, such as the receiver 200, for a particular data rate and/or a particular wavelength.

Certain embodiments may incorporate various additional aspects or components to further provide selectivity of one light signal over another. For example, light of certain wavelengths may be preferred or rejected through the use of frequency selective filters, frequency selective coatings, and/or by selection of frequency selective dimensions or other features of an optical resonator or other resonant structures.

In various examples, components of a receiver may be implemented as one of, or a combination of, analog circuitry, digital circuitry, or one or more digital signal processors (DSP) or other microprocessors executing software instructions. Software instructions may include DSP instructions. Various aspects and functions described herein may be implemented as specialized hardware or software components executing in one or more computer systems.

Figure 8:
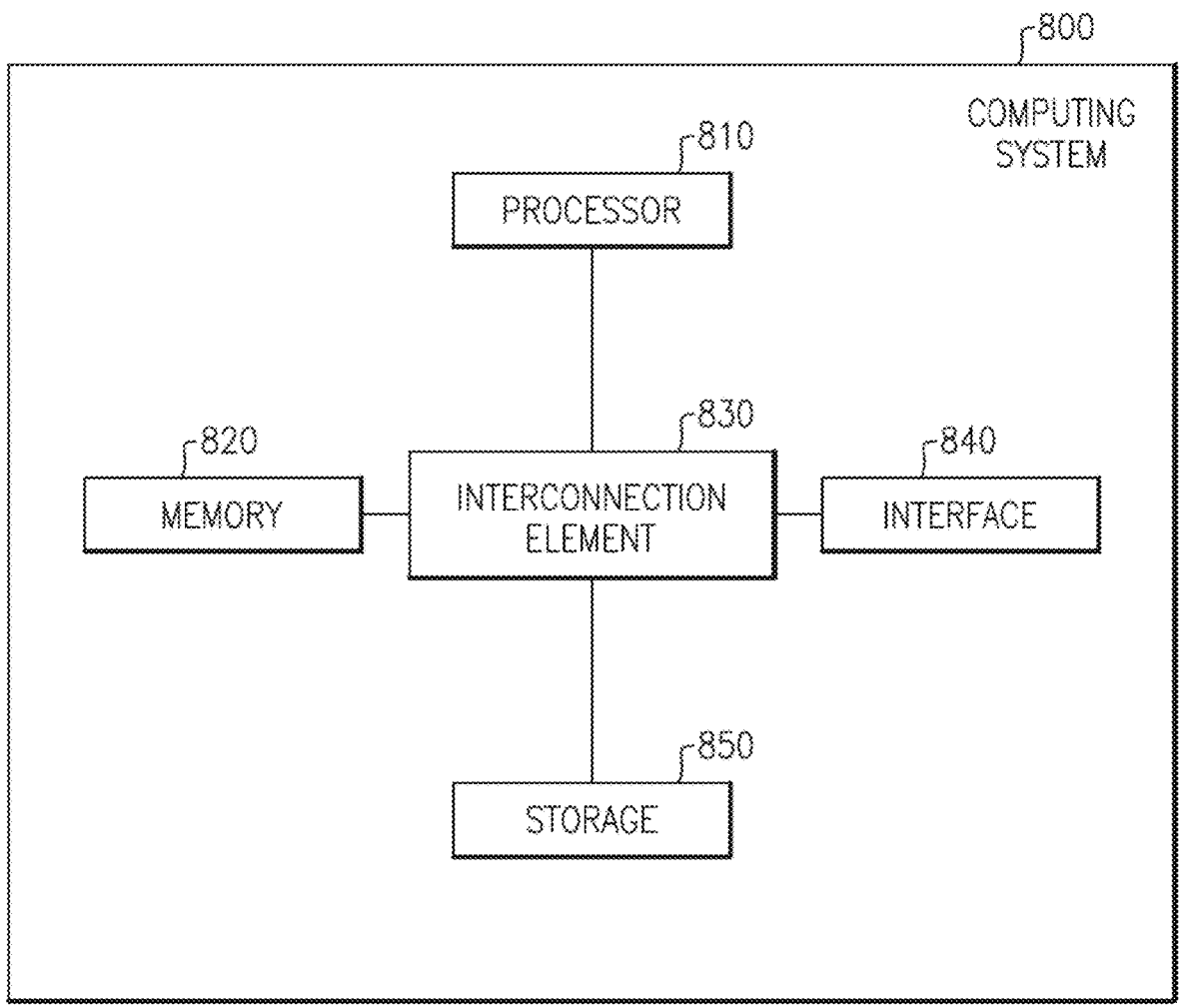
FIG. 8 is a functional block diagram of an example of a computing system that may be configured to implement various examples of the processes described herein.

FIG. 8 illustrates one example of a control circuit (e.g., a controller 800) that may implement software routines corresponding to various components of a receiver, such as the digital processing subsystem 250 of FIG. 2 and/or other components of a receiver 200. The controller 800 may include a processor 802, a data store 804, a memory 806, and one or more interfaces 808, such as a system interface and/or a user interface. While not explicitly illustrated in FIG. 8, in certain examples the controller 800 may be coupled to a power source. The power source may deliver power to one or more components of the controller 800, as well as other components of the optical receiver 200.

In FIG. 8, the processor 802 is coupled to the data storage 804, memory 806, and the various interfaces 808. The memory 806 stores programs (e.g., sequences of instructions coded to be executable by the processor 802) and data during operation of the controller 800. Thus, the memory 806 may be a relatively high performance, volatile, random access memory such as a dynamic random access memory ("DRAM") or static memory ("SRAM"). However, the memory 806 may include any device for storing data, such as a disk drive or other nonvolatile storage device. Various examples may organize the memory 806 into particularized and, in some cases, unique structures to perform the functions disclosed herein. These data structures may be sized and organized to store values for particular data and types of data.

The data storage 804 includes a computer readable and writeable data storage medium configured to store non-transitory instructions and other data, and can include non-volatile storage media, such as optical or magnetic disk, ROM or flash memory. The instructions may include executable programs or other code that can be executed by the at least one processor 802 to perform any of the functions described herein.

In various examples, the controller 800 includes several interface components 808, such as a system interface and/or a user interface. Each of the interface components 808 is configured to exchange, e.g., send or receive, data with other components of the controller 800 (and/or associated transmitter or receiver), or other devices in communication with the controller 800. According to various examples, the interface components 808 may include hardware components, software components, or a combination of hardware and software components.

In certain examples, components of the system interface couples the processor 802 to one or more other components of the optical receiver 200 shown in FIG. 2. The system interface may provide one or more control signals to any such components and may manage the operation of such components.

A user interface may include hardware and/or software components that allow a corresponding transmitter or receiver in which the controller 800 is incorporated to communicate with an external entity, such as a user. These components may be configured to receive information from user interactions with the user interface. Examples of the components that may be employed within the user interface include keyboards, pointing devices, buttons, switches, light-emitting diodes, touch screens, displays, stored audio signals, voice recognition, or an application on a computer-enabled device in communication with the controller 800. Data received at the various interfaces may be provided to the processor 802, as illustrated in FIG. 8. Communication coupling (e.g., shown interconnection mechanism 810) between the processor 802, memory 806, data storage 804, and interface(s) 808 may be implemented as one or more physical busses in conformance with standard, proprietary, or specialized computing bus technologies.

The processor 802 performs a series of instructions that result in manipulated data that may be stored in and retrieved from the data storage 804. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 802 may be any type of processor, multi-processor or controller, whether commercially available or specially manufactured, which may include application specific integrated circuits (ASICs), general purpose processors (DSPs), digital signal processors, field programmable gate arrays (FPGAs), or other suitable processing hardware. In some examples, the processor 802 may be configured to execute an operating system, such as a real-time operating system (RTOS) or a non-real time operating system. The operating system may provide platform services to application software. These platform services may include inter-process and network communication, file system management and standard database manipulation, among others. One or more of many operating systems may be used, and examples are not limited to any particular operating system or operating system characteristic.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
   a first optical resonator configured to receive an arriving optical signal having a wavelength, to emit first output optical signal energy in response to receiving the arriving optical signal, and to be deliberately positively detuned from the wavelength of the arriving optical signal;
   a second optical resonator configured to receive the arriving optical signal, to emit second output optical signal energy in response to receiving the arriving optical signal, and to be deliberately negatively detuned from the wavelength of the arriving optical signal; and
   a detector configured to determine the phase transition in the arriving optical signal based upon a transient response in at least one of the first output optical signal energy and the second output optical signal energy.

2. The optical signal receiver of claim 1 wherein the detector is further configured to distinguish a magnitude and a direction of the phase transition, and to uniquely identify the magnitude and direction of the phase transition from among a set of candidate phase transitions, the set of candidate phase transitions being a set of phase transitions that result in an equivalent final state of the arriving optical signal.

3. The optical signal receiver of claim 1 wherein the detector is further configured to distinguish phase transitions of 360° or greater.

4. The optical signal receiver of claim 1 wherein each of the first and second optical resonators is an etalon having two semi-reflective surfaces configured to at least partially trap optical signal energy by reflecting a portion of the optical signal energy impinging upon each of the semi-reflective surfaces.

5. An optical signal receiver comprising:
   a first optical resonator configured to receive an arriving optical signal, and to emit a first output optical signal energy in response to receiving the arriving optical signal;
   a second optical resonator configured to receive the arriving optical signal, and to emit a second output optical signal energy in response to receiving the arriving optical signal;
   a detector configured to determine a phase transition in the arriving optical signal based upon a transient response in at least one of the first output optical signal energy and the second output optical signal energy; and
   a third optical resonator configured to receive the arriving optical signal and to emit third output optical signal energy in response to receiving the arriving optical signal, wherein the detector is configured to determine the phase transition based at least in part upon a comparison between at least two of the first output optical signal energy, the second output optical signal energy, and the third output optical signal energy.

6. A method of detecting information encoded in an arriving optical signal, the method comprising:
   receiving a portion of the arriving optical signal at each of a plurality of optical resonators, the arriving optical signal having a wavelength;
   analyzing a respective output optical signal from each of the plurality of optical resonators; and
   determining a phase transition in the arriving optical signal based on one or more variations in intensity level of one or more of the output optical signals, wherein a first optical resonator of the plurality of optical resonators is deliberately positively detuned from the wavelength of the arriving optical signal and a second optical resonator of the plurality of optical resonators is deliberately negatively detuned from the wavelength of the arriving optical signal.

7. The method of claim 6 wherein determining the phase transition includes uniquely identifying a magnitude and a direction of the phase transition from among a set of candidate phase transitions, the set of candidate phase transitions being a set of phase transitions that result in an equivalent final state of the arriving optical signal.

8. The method of claim 6 wherein determining the phase transition includes distinguishing phase transitions of 360° or greater.

9. The method of claim 6 wherein each of the plurality of optical resonators is an etalon having two semi-reflective surfaces, and further comprising:
   producing the respective output optical signal from each of the plurality of optical resonators by resonating optical signal energy inside each of the plurality of optical resonators by reflecting a portion of the optical signal energy impinging upon each of the semi-reflective surfaces.

10. The optical signal receiver of claim 1 wherein the first optical resonator is deliberately positively detuned from the wavelength of the arriving optical signal according to:

$$L_1 = n\lambda/2 + \varepsilon,$$

where $L_1$ is a dimension of the first optical resonator, n is an integer number of wavelengths, $\lambda$ is the wavelength of the arriving optical signal, and $\varepsilon$ is a dimensional variant; and wherein the second optical resonator is deliberately negatively detuned from the wavelength of the arriving optical signal according to:

$$L_2 = n\lambda/2 - \varepsilon,$$

where $L_2$ is a dimension of the second optical resonator.

11. The optical signal receiver of claim 1 wherein the detector is further configured to distinguish the phase transition from one or more multiples of 360° of rotation from the phase transition based on the response of the first optical resonator and/or the response of the second optical resonator.

12. The optical signal receiver of claim 1 further comprising a third optical resonator configured to receive the arriving optical signal and to emit third output optical signal energy in response to receiving the arriving optical signal.

13. The optical signal receiver of claim 12 further comprising:
    a third optical resonator configured to receive the arriving optical signal, to emit third output optical signal energy in response to receiving the arriving optical signal, and to be deliberately tuned to the wavelength of the arriving optical signal,
    wherein the detector is further configured to determine the phase transition based at least in part upon a comparison between at least two of the first output optical signal energy, the second output optical signal energy, and the third output optical signal energy.

14. The optical signal receiver of claim 1 wherein the detector is further configured to distinguish the phase transition from a full phase rotation of the phase transition around a polar coordinate system, the full phase rotation being a full clockwise or a full counter-clockwise rotation around the polar coordinate system.

15. The method of claim 6 wherein deliberately positively detuning the first optical resonator comprises adjusting a dimension $L_1$ of the first optical resonator according to:

$$L_1 = n\lambda/2 + \varepsilon,$$

where $L_1$ is a dimension of the first optical resonator, n is an integer number of wavelengths, $\lambda$ is wavelength of the arriving optical signal, and $\varepsilon$ is a dimensional variant; and wherein deliberately negatively detuning the second optical resonator comprises adjusting a dimension $L_2$ of the second optical resonator according to $$L_2 = n\lambda/2 - \varepsilon,$$

where $L_2$ is a dimension of the second optical resonator.

16. The method of claim 6 further comprising distinguishing the phase transition from one or more multiples of 360° of rotation from the phase transition based on a response of one or more of the plurality of optical resonators receiving the arriving optical signal.

17. The method of claim 6 wherein the plurality of optical resonators comprises at least three optical resonators.

18. The method of claim 17 wherein determining the phase transition in the arriving optical signal comprises:
- deliberately tuning a third optical resonator of the plurality of optical resonators to the wavelength of the arriving optical signal; and
- determining the phase transition in the arriving optical signal based on the one or more variations in intensity level of the one or more of the output optical signals of the at least three optical resonators.

19. The method of claim 6 further comprising distinguishing the phase transition from a full phase rotation of the phase transition around a polar coordinate system, the full phase rotation being a full clockwise or a full counter-clockwise rotation around the polar coordinate system.

\* \* \* \* \*